United States Patent Office 3,415,622
Patented Dec. 10, 1968

3,415,622
METHOD FOR INHIBITING CORROSION
Richard Waack, Framingham, Mass., assignor to The Dow Chemical Company, Midland, Mich., a corporation of Delaware
No Drawing. Original application Aug. 26, 1963, Ser. No. 305,198, now Patent No. 3,305,388, dated Feb. 21, 1967. Divided and this application Aug. 15, 1966, Ser. No. 600,281
5 Claims. (Cl. 23—154)

This application is a divisional application of my parent application Ser. No. 305,198, filed Aug. 28, 1963, now U.S. Patent 3,305,388, issued Feb. 21, 1967.

The present invention relates to a process for inhibiting corrosion of metals by protonic acids in aqueous systems.

In numerous industrial processes, metals such as iron, zinc and alloys of these metals are corroded as the result of contact with aqueous systems containing protonic acids. It is desirable and an object of the invention to provide a new and improved method for inhibiting such corrosion. Particularly, it is an object to inhibit corrosion by incorporating a chemical agent into the corrosive media as well as directly coating the metal to be protected with such agent. Other objects will become apparent hereinafter as the invention is more fully described.

The foregoing objects are accomplished in the discovery that the corrosion of certain metals including zinc, iron and alloys of these metals, particularly in the presence of water and protonic acids, is substantially reduced or eliminated by contacting the metals with an organo tin compound according to the following formula:

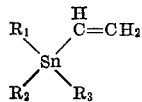

wherein $R_1$, $R_2$ and $R_3$ are independently selected from the group consisting of

alkyl hydrocarbon groups having from 2 to 6 carbons and aryl hydrocarbon groups having from 6 to 10 carbons, with the further limitation that at least one of the substituent R groups shall be an alkyl or aryl group as specified.

The aforementioned corrosion inhibitors can be directly applied as a thin film to the metal surface prior to its exposure to the corrosive media, or as an alternate and most convenient mode of operation, the corrosion inhibitors can be mixed directly with liquid media containing the corrosive protonic acids. Inasmuch as the corrosion inhibitors are either liquids, or solids soluble in a variety of organic solvents, they can be applied to metal surfaces by any convenient technique such as spraying, brushing or simply pouring them on the metal surface to be protected. If the alternate method of application is chosen, i.e., direct incorporation of the organo tin compound into the corrosive liquid media, the amount of the organo tin compound employed should be at least about 0.001 percent by weight of such media. Larger amounts up to as much as 5 to 10 percent are effective, but at such large concentrations the treatment tends to become uneconomical.

Best results are obtained in accordance with the invention when the described organo tin inhibitors are employed to protect the metals against attack by dilute aqueous protonic acids. By dilute is meant solutions containing less than 20 percent by weight of the protonic acid as solute. Although the inhibitor is effective at higher concentrations, certain strong protonic acids such as nitric and sulfuric acids tend to destroy the inhibitor compound.

On the other hand, concentrated hydrochloric acid does not destroy the corrosion inhibiting properties of the organo tin compounds. Thus, the compounds provide highly efficacious means for inhibiting corrosion by concentrated hydrochloric acid.

The aforementioned organo tin compounds can be obtained according to several known modes of preparation. See, for example U.S. Patent 2,720,507 for a bibliography on preparative techniques for several classes of organo tin compounds.

An example of a preferred preparative method involves contacting under mild temperature conditions tetravinyl tin with an alkyl or aryl alkali metal compound in the presence of an inert, mutual solvent for the reactants. Best results are obtained if from about ½ up to about 3 moles, preferably from about 1 up to about 2 moles, of the latter class of reactants is employed for each mole of the tetravinyl tin utilized. With larger relative proportions of the latter reactant, significant proportions of by-products useless to the present invention may be produced.

Preferably, the reaction is carried out by contacting these reactants in a liquid aliphatic hydrocarbon solvent, optionally in the presence of an alkyl ether such as diethyl ether, ethyl methyl ether or tetrahydrofuran. Aryl ethers such as diphenyl oxide also are satisfactory for this purpose. The reaction is continued at a moderate temperature, e.g., within the range of 20 to 50° C., for a period of time sufficient to produce a significant proportion of the desired product. Following the reaction the solvent system and ether are evaporated. The residual material is usually a yellow oily substance which can be filtered to remove any insoluble by-products.

Alkyl hydrocarbon alkali metal compounds suitable for employment in the foregoing reaction include ethyl lithium, propyl lithium, butyl lithium, hexyl lithium, butyl sodium, amyl sodium, ethyl potassium, butyl potassium and the like. Aryl hydrocarbon alkali metal compounds include phenyl lithium, phenyl sodium, phenyl potassium, tolyl sodium, xylyl sodium, mesityl lithium, ethyl phenyl lithium, tertiary butyl phenyl lithium and the like aryl hydrocarbon alkali metal compounds. Any one or more of such reactants can be employed in admixture with the tetravinyl tin.

While the aforementioned mode of preparation for the organo tin compounds employed herein is the preferred method, other preparative methods will occur to those skilled in the art. One such alternate method involves reacting one or more of the aforementioned alkyl or aryl hydrocarbon alkali metal compounds with divinyl tin dichloride.

The present invention is illustrated by the following examples, of which Examples 1–3 show methods for the preparation of the organo tin compositions employed in the invention. The remaining examples illustrate the unique corrosion inhibiting capabilities of these compounds. Also, other organo tin compounds and combinations thereof with certain organic materials are compared in their effectiveness as corrosion inhibitors relative to the corrosion inhibitors of the invention.

EXAMPLE 1

In a suitable reaction vessel 0.25 mole of tetravinyl tin was reacted with 0.5 mole of butyl lithium in about 312 milliliters of a hexane-pentane hydrocarbon fraction and 50 milliliters of dry diethyl ether. The reaction, which was conducted at room temperature, was continued for one hour. A small amount of methanol was then added to quench the reaction. The reaction product was then filtered to remove vinyl lithium which had precipitated as a by-product of the condensation reaction. The organic solvents were removed from the filtered reaction mixture by distillation over a steam bath thereby leaving a slightly yellow oily material. Infrared analysis of the oily material indicated it to be a mixture of trivinylbutyl tin, divinyl dibutyl tin and vinyl tributyl tin. The major ingredient was the symmetrical compound.

EXAMPLE 2

A second organo tin composition was prepared according to the foregoing procedure except that phenyl lithium was employed in place of butyl lithium. One of the products produced was tetraphenyl tin which was insoluble in the reaction system. Filtration of the reaction product and subsequent evaporation of the solvent gave a yellow oil similar in appearance to that prepared above. This oil was subjected to infrared analysis and found to be a mixture of trivinyl phenyl tin, divinyl diphenyl tin and vinyl triphenyl tin.

EXAMPLE 3

An organo tin composition was prepared as in Example 1 except that diethyl ether was omitted from the reaction system, i.e., the reaction was done in a hexane-pentane hydrocarbon fraction alone. After filtration and distillation, the purified liquid reaction product was substantially identical in appearance and composition to that prepared in Example 1.

EXAMPLE 4

To illustrate the corrosion inhibiting capabilities of the organo tin compositions hereinbefore described, a test was set up as follows: A small amount of the material to be tested was directly applied to about one gram of granulated zinc in a glass container. The amount of the corrosion inhibitor applied was just sufficient to wet the surface of the zinc. Subsequently, concentrated hydrochloric acid was poured onto the mixture and the nature of the ensuing reaction observed. In addition to the organo tin compounds of the invention, other organo metallic compounds and organic corrosion inhibitors were also tested. The comparative results are indicated in the following table.

TABLE 1

| Run No. | Inhibitor Composition | Inhibition Quality |
| --- | --- | --- |
| 1 | Vinyl butyl tin composition of Example 1. | No apparent reaction between HCl and the zinc. |
| 2 | Vinyl phenyl tin composition prepared in Example 2. | Do. |
| 3 | Vinyl butyl tin composition prepared in Example 3. | Do. |
| 4 | Divinyl dibutyl tin | No reaction. |
| 5 | Tetravinyl tin | Vigorous initial reaction subsiding to slower reaction until the zinc was consumed. |
| 6 | Tetraphenyl tin plus toluene | Vigorous reaction until the zinc was entirely consumed. |
| 7 | Tetravinyl tin plus tetraphenyl tin. | Vigorous initial reaction subsiding to slower reaction until the zinc was consumed. |
| 8 | Vinyl tin trichloride | Mild reaction continuing until the zinc was consumed. |

Other materials tested included tetraphenyl tin plus styrene, styrene, tin tetrachloride, tin tetrachloride plus mineral oil, polystyrene in benzene, tertiary butyl alcohol, and mineral oil. With each of these materials the zinc was completely reacted with the hydrochloric acid within a relatively short period.

In a further experiment two drops of the organo tin composition prepared in Example 3 were added to 15 ml. of concentrated hydrochloric acid. The resulting solution poured onto about 0.2 gram of granulated zinc. There was no reaction, and the zinc remained bright and shiny.

EXAMPLE 5

Two small pieces of iron wire were weighed. One wire sample was coated with a small amount of a mixed vinyl butyl tin composition prepared in a manner similar to that of Example 1. Both iron samples were placed in concentrated hydrochloric acid. After three hours the samples were removed, dried and reweighed. Thirty-four percent of the untreated iron wire remained while 65 percent of the treated sample remained.

In further experiments the organo tin compositions of the invention were demonstrated to inhibit the corrosion of zinc and iron in the presence of dilute hydrochloric and sulfuric acids.

What is claimed is:

1. A method for inhibiting protonic acid attack of a metal containing an element of the group consisting of zinc and iron, which metal is in contact with an aqueous system containing a dilute protonic acid, which method comprises introducing into such aqueous system a small amount of an organo tin composition sufficient to inhibit protonic acid attack of the metal, said organo tin compound having the general formula:

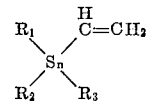

wherein $R_1$, $R_2$ and $R_3$ are independently selected from the group consisting of

alkyl hydrocarbons having from 2 to 6 carbons and aryl hydrocarbons having from 6 to 10 carbons, with the further overall limitation that at least one of the R groups shall be of the class of alkyl and aryl hydrocarbons as specified.

2. A method for inhibiting corrosion of a metal containing an element of the group consisting of zinc and iron by concentrated hydrochloric acid, which method comprises introducing into the concentrated hydrochloric acid a small amount of an organo tin composition sufficient to inhibit acid attack of the metal, said organo tin compound having the general formula:

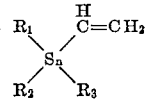

wherein $R_1$, $R_2$ and $R_3$ are independently selected from the group consisting of

alkyl hydrocarbons having from 2 to 6 carbons and aryl hydrocarbons having from 6 to 10 carbons, with the further overall limitation that at least one of the R groups shall be of the class of alkyl and aryl hydrocarbons as specified.

3. A method for inhibiting corrosion of zinc by hydrochloric acid which comprises introducing into the hydrochloric acid a small amount of an organo tin composition sufficient to inhibit acid attack of the metal, said organo tin compound having the general formula:

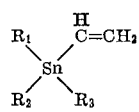

wherein $R_1$, $R_2$ and $R_3$ are independently selected from the group consisting of

alkyl hydrocarbons having from 2 to 6 carbons and aryl hydrocarbons having from 6 to 10 carbons, with the further overall limitation that at least one of the R groups shall be of the class of alkyl and aryl hydrocarbons as specified.

4. A method for inhibiting corrosion of zinc by concentrated hydrochloric acid which comprises introducing into the acid a small amount of divinyl dibutyl tin sufficient to inhibit acid attack of the metal.

5. A method for inhibiting corrosion of zinc by concentrated hydrochloric acid which comprises introducing into the acid a small amount of divinyl diphenyl tin sufficient to inhibit acid attack of the metal.

References Cited
UNITED STATES PATENTS

| | | | |
|---|---|---|---|
| 2,962,522 | 11/1960 | Gibbons et al. | 260—429.7 |
| 3,074,985 | 2/1963 | Smolin et al. | 260—429.7 |
| 3,223,686 | 2/1965 | Natta et al. | 260—429.7 XR |

OTHER REFERENCES

Seyforth, D.: Journ. Amer. Chem. Soc., vol. 79, 1957, p. 2133–2136.

OSCAR R. VERTIZ, *Primary Examiner.*

E. STERN, *Assistant Examiner.*

U.S. Cl. X.R.

23—157, 167; 117—127; 252—389